Figure 1:
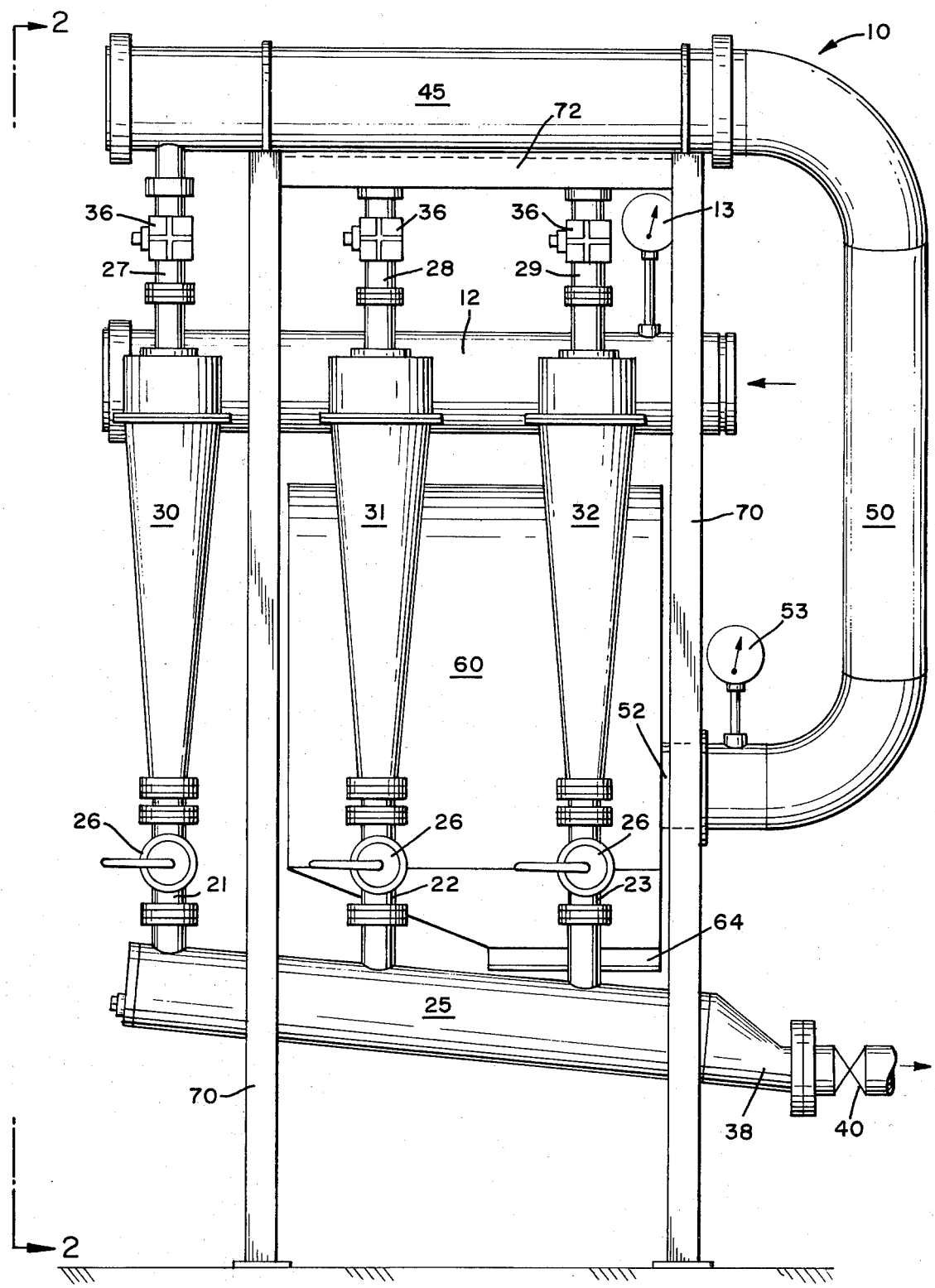

United States Patent
Bier

[11] 3,989,628
[45] Nov. 2, 1976

[54] DEGRITTING AND FIBER REMOVAL SYSTEM

[75] Inventor: Thomas H. Bier, Stamford, Conn.

[73] Assignee: Dorr-Oliver Incorporated, Stamford, Conn.

[22] Filed: Jan. 3, 1975

[21] Appl. No.: 538,443

[52] U.S. Cl. ................................. 210/255; 209/17; 210/73 S; 210/84; 210/262; 210/512 M
[51] Int. Cl.² ........................................... C02C 1/24
[58] Field of Search ............... 209/12, 17, 211, 250, 209/281, 300, 305, 362; 210/73 R, 84, 252, 255, 262, 304, 512 R, 512 M

[56] References Cited
UNITED STATES PATENTS

| | | | |
|---|---|---|---|
| 2,754,968 | 7/1956 | Vegter et al. | 210/512 M |
| 2,855,099 | 10/1958 | Koning | 209/305 X |
| 2,917,174 | 12/1959 | Fontein | 209/281 X |
| 2,996,182 | 8/1961 | Fontein | 209/211 |
| 3,374,885 | 3/1968 | Clawson et al. | 209/17 |
| 3,543,931 | 12/1970 | Rastatter | 210/512 M |
| 3,638,791 | 2/1972 | Harrison | 209/12 |
| 3,720,315 | 3/1973 | Kaiser | 209/211 |
| 3,899,414 | 8/1975 | Hansen | 209/12 |

FOREIGN PATENTS OR APPLICATIONS

| | | | |
|---|---|---|---|
| 632,603 | 10/1932 | Germany | 209/211 |
| 296,115 | 8/1964 | Netherlands | 209/12 |
| 914,064 | 12/1962 | United Kingdom | 209/12 |

*Primary Examiner*—Charles N. Hart
*Assistant Examiner*—Robert G. Mukai
*Attorney, Agent, or Firm*—H. M. Snyder; Burtsell J. Kearns; Theodore M. Jablon

[57] ABSTRACT

Apparatus for removing grit and fiber from waste activated sewage sludge prior to introduction into a centrifuge for further separation. Grit removal is accomplished by hydrocyclones and fiber removal is carried out on a 300° screen. The hydrocyclones and screen, together with connecting conduits, are conveniently mounted on a supporting frame for facilitating transportation of the unit and for maintaining the predetermined structural relationships of the various members.

3 Claims, 3 Drawing Figures

DEGRITTING AND FIBER REMOVAL SYSTEM

The invention is directed to an apparatus for degritting and removing fibers from a waste activated sludge.

In the treatment of waste activated sludge the underflow of the secondary clarifier is often concentrated in a disc nozzle centrifuge prior to final disposal; for example, incineration or land fill. The centrifuge employed in this dewatering process is subject to plugging by the fibers which commonly occur in the sludge, so some means must be provided to remove the fibers before introducing the sludge into the centrifuge. A rotary strainer or a screen device are ways in which the fibers may be removed from the sludge. In the selection of a method for fiber removal, particular attention must be given to the fact that the method utilized must be capable of rejecting fibers having a diameter of 100 microns and a length of 500 microns. It must also be recognized that the sludge undergoing treatment also contains abrasive grit and it is prudent to make provision for removal of such grit to prevent unacceptable wear on the devices through which the sludge must pass.

A novel treatment unit has now been provided which includes degritting and fiber removal units conveniently mounted on a unitizing frame.

It is the object of this invention to provide an improved degritting and fiber removal unit which is transportable as a unit and wherein the various members and conduits thereof are assembled and maintained in their predetermined positions within the unit.

Figure 2:
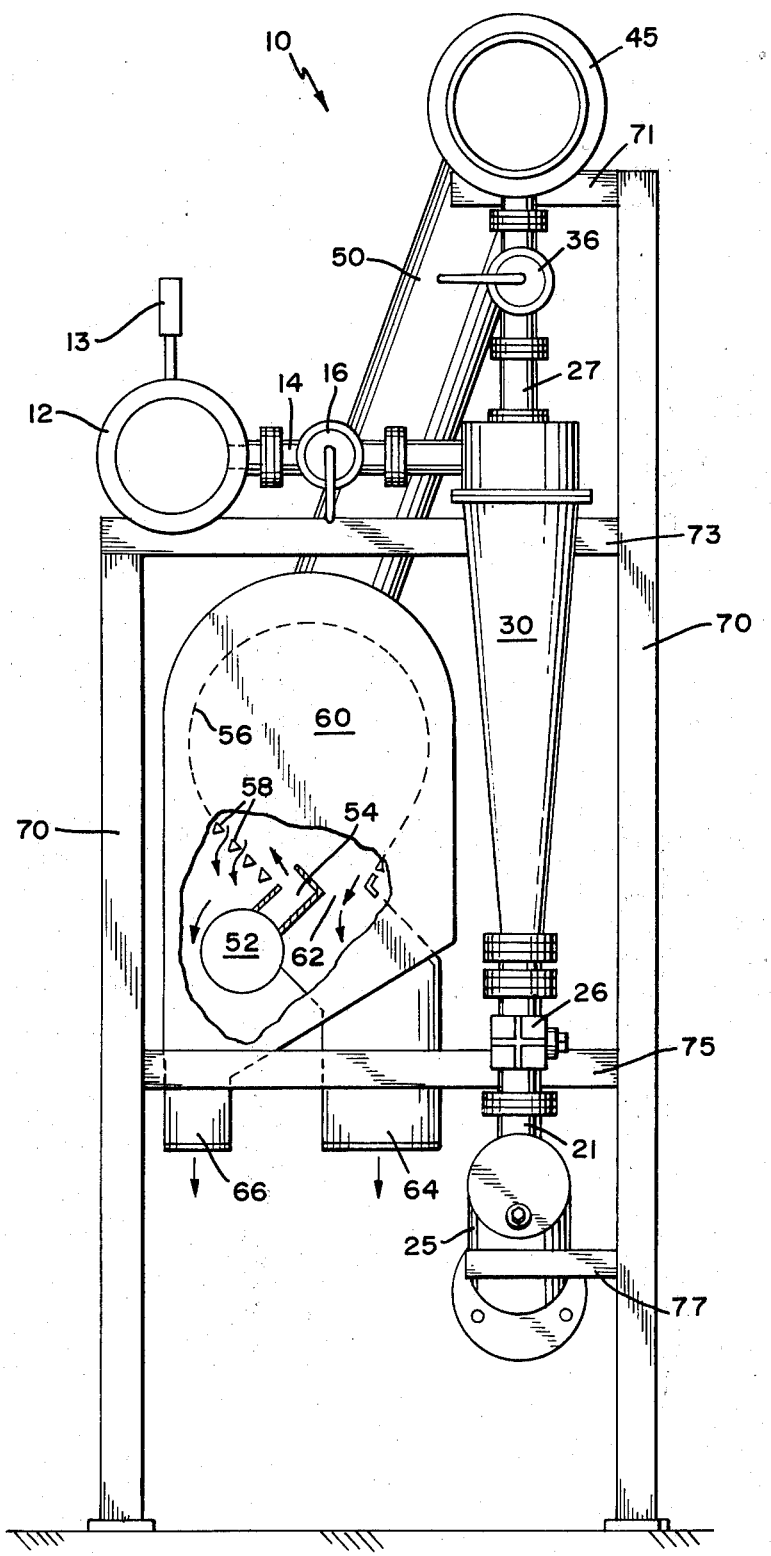
Figure 3:
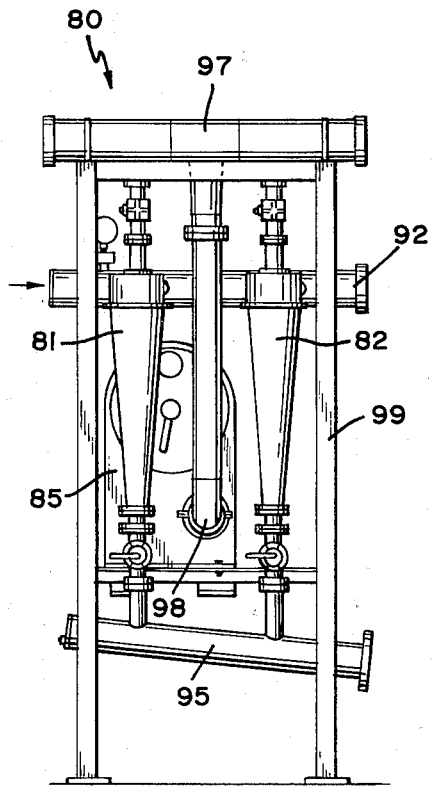

Other objects and advantages will become apparent from the following description taken in conjunction with the accompanying drawings in which:

FIG. 1 is a front elevational view of the degritting and fiber removal unit of the invention, FIG. 2 is a side elevational view of the unit of the invention taken along line 2—2 of FIG. 1, and FIG. 3 is a front elevational view of a modified embodiment of the fiber removal and degritting unit of the invention.

Generally speaking, the degritting and fiber removal unit of the present invention comprises a plurality of hydrocyclones arranged for parallel flow, the hydrocyclones having inlet, underflow and overflow manifolds, the underflow manifold having a constricted outlet and the overflow manifold connected to a screen device.

More particularly, the invention relates to a two-stage system for degritting and fiber removal from a feed stream; the hydrocyclones constituting the first stage and the screen constituting the second stage. The first stage is employed in such a way that only a limited amount of energy is consumed, leaving a sufficient amount of energy for the second stage. Thus, the hydrocyclones are sized (including internal orifices, etc.) to require a pressure drop amounting to approximately 50% of the overall pressure available. The underflow manifold may be inclined from the horizontal to provide gravity flow of the grit-containing effluent and the constricted outlet of the underflow manifold limits the amount of underflow discharge. The screen device is a generally cylindrical 300° screen having an interbar spacing of less than 0.35 mm. The hydrocyclones, screen device, manifolds and connecting conduits are mounted on a single supporting frame thereby providing a unitized construction for transportation and installation as a unit whereby the predetermined positions of the various components of the unit are maintained.

Referring now to FIGS. 1 and 2 of the drawings, there is illustrated a degritting and fiber removal unit 10 which incorporates hydrocyclones 30, 31 and 32 and the screen device 60. An inlet manifold 12 is provided having a pressure indicating device 13 thereon. The inlet manifold 12 is connected to the inlet of each of the hydrocyclones 30, 31 and 32 by conduits 14 each having an isolating valve 16 therein. The hydrocyclone outlet conduits 21, 22 and 23 are each provided with an isolating valve 26 and the outlets are connected to the inclined manifold chamber 25. A valve 40 controls the outlet 38 of the manifold 25. The hydrocyclone overflow outlets are each connected to the overflow manifold 45 by the conduits 27, 28 and 29, each having an isolating valve 36 therein. The overflow manifold 45 is connected to the screen inlet 52 by the downcomer 50 which has a pressure indicating device 53 mounted thereon adjacent the screen inlet 52. Internally the screen device 60 has a nozzle 54 (FIG. 2) connected to the screen inlet 52. The nozzle 54 is directed to initiate a flow of fluid along the inner surface of a generally cylindrical screen element 56 which has an arcuate extent of 300°. The screen element 56 is made up of the individual bars 58 which are spaced apart to provide the screening effect. An outlet 62 for the rejects is provided which opens into the rejects conduit 64. A fine fraction conduit 66 is also provided for the material which passes through the screen 56.

In operation, the sludge feed is introduced into the manifold 12 where entering pressure is detected by the pressure indicating device 13. The feed then passes through conduits 14 to the inlets of the hydrocyclones 30, 31 and 32. In the hydrocyclones a separation occurs and a portion of the fluid together with the greater part of the grit moves down to the hydrocyclone outlet conduits 21, 22 and 23 to the manifold 25. The manifold conduit 25 is inclined so as to direct a flow of grit toward the manifold outlet 38. The valve 40 which controls the manifold outlet 38 may be maintained in a partially closed position which allows but a trickle of flow past the valve. Alternatively, it is possible, in low grit applications, to maintain valve 40 in a normally closed position and only open it at predetermined intervals to purge the manifold of grit. Either mode of operation normally maintains the pressure within the hydrocyclone underflow manifold portion of the system as well as in the hydrocyclones themselves. In the hydrocyclone outlet conduits 21, 22 and 23 and in the manifold conduit 25 itself an interchange of flows occurs during operation with a heavy grit fraction continuously moving into the manifold conduit 25 and a light fraction continuously moving up through the outlet conduits 21, 22 and 23. The overflow fraction from the hydrocyclones flows upward through the overflow conduits 27, 28 and 29 into the overflow manifold 45 and then into the downcomer 50 to the screen inlet 52. The pressure at the screen inlet is detected by the pressure meter 53 provided at that point. The feed introduced into the screen device 60 through the feed inlet 52 enters the nozzle 54 and is directed along the inner surface of the cylindrical screen element 56. The fine fraction passes through the slots provided between the screen bars 58 and is discharged through the outlet 66 which will be connected to the centrifuge inlet (not shown). The fibers rejected by the screen and a portion of the fluid pass through the rejects outlet 62 to the rejects conduit 64 for separate disposal.

The screen element 56 of the screen device 60 has, as described, a very fine interbar spacing of less than 0.35 mm. Such a fine screen is necessary in this case to reject the fibers in the waste activated sewage sludge. It is very expensive to produce fine screens of this type and consequently it is prudent to protect the screens from excessive wear and thus avoid costly replacement. It has been found that the grit contained in the sludge feed subjects the screen element to rapid and excessive wear. If the screen is not protected against such wear, it will, in far too short a period, fail to function as required. Thus, the hydrocyclones are provided to remove the abrasive grit from the feed and so protect the screen against excessive wear.

The isolating valves in each of the conduits attached to the hydrocyclones, i.e., valves 16, 26 and 36, remain in the open position during normal operation. These valves are only provided as a convenient means of isolating each of the hydrocyclones for repair, maintenance, replacement or to adjust the capacity of the overall system to lower flow rates by eliminating flow through one or more of the hydrocyclones.

The entire unit including the hydrocyclones, the screen, the manifold conduits and other conduits are supported on a single frame having the uprights 70 and the crosspieces 71, 72, 73, 75 and 77. It will be noted that the crosspieces provide support for various elements of the unit. Thus, the crosspiece 71 supports the overflow manifold 45, the crosspiece 73 supports the inlet manifold 12, the crosspiece 75 supports the screen device 60, and the crosspiece 77 supports the underflow manifold 25.

It should be understood that since the screen has such a fine interbar spacing, a high feed velocity of at least 35 ft/sec is required to prevent blinding of the screen surface. Ordinarily, to achieve this high velocity, a pump would be provided between the overflow of the hydrocyclones and the screen feed inlet. However, as described previously, the hydrocyclone system is sized or tuned to utilize only about one-half of the available pressure drop and thereby provide sufficient pressure in its overflow discharge to satisfy the minimum velocity requirement of the screen. The relatively high pressure which appears at the screen inlet 52 and the nozzle 54 provides the necessary high velocity of feed along the screen surface.

Both the inlet manifold conduit 12 and the overflow conduit 45 are horizontally mounted. Either end of the manifold 12 can be connected to a feed conduit to the system. Similarly, the downcomer 50 can be attached to the overflow manifold 45 at either end thereof. It is thus seen that the unitized construction of this degritting and fiber removal unit provides remarkable versatility in application.

In FIG. 3 a modified embodiment of the degritting and fiber removal unit is illustrated. The unit 80 includes on frame 99 a pair of hydrocyclones 81, 82, screen 85, a feed manifold 92, an underflow manifold 95 and an overflow manifold 97. In this embodiment the downcomer 98 forms a T with manifold 97 and is positioned between the hydrocyclones 81, 82. In order to accommodate the changed position of the downcomer 98, the screen has been turned 90° to bring the screen feed inlet into alignment with the end of the downcomer.

While the outlet manifold has been described as an inclined member, it will be understood that this member may be arranged horizontally. In that case, the intermittent purging process described above will clean the manifold in satisfactory fashion.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A degritting and fiber removal unit for treating sewage feed prior to introduction into a centrifugation stage, comprising
   a plurality of hydrocyclones arranged in a parallel flow pattern for degritting said feed,
   an inlet manifold connected to the hydrocyclone inlets for introducing grit and fiber-containing feed into said hydrocyclones,
   an underflow manifold chamber connected to each underflow outlet of said hydrocyclones for grit disposal,
   said underflow manifold chamber being inclined from the horizontal to provide gravity flow of the grit-containing effluent within said chamber, and having a constricted inlet at the lower end to limit the underflow from said manifold chamber to maintain elevated pressure within the manifold chamber and in said hydrocyclones,
   an overflow manifold connected to each overflow outlet of said hydrocyclones,
   a screen device comprised of a plurality of spaced, parallel bars having an arcuate extent of 300° for fiber removal having an inlet,
   said hydrocylones being internally sized to utilize no more than about one-half the pressure drop across the unit thereby providing sufficient pressure at the screen inlet to assure a feed velocity of at least 35 ft/sec across the screen surface,
   a downcomer connecting said overflow manifold with the inlet of said screen device, and
   the members comprising said unit, including said hydrocyclones, screen device, manifolds and connecting conduits, being mounted on a single supporting frame for transportation and installation as a unit to maintain the predetermined positions of said members and conduits.

2. The degritting and fiber removal unit of claim 1 wherein said constricted outlet is provided by a valve member.

3. The degritting and fiber removal unit of claim 2 wherein the interbar spacing of said screen element is less than 0.35 mm.

* * * * *